(12) United States Patent
Tamao

(10) Patent No.: US 12,731,471 B2
(45) Date of Patent: Sep. 8, 2026

(54) CONTROL DEVICE FOR VEHICLE

(71) Applicant: TOYOTA JIDOSHA KABUSHIKI KAISHA, Toyota (JP)

(72) Inventor: Junichiro Tamao, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/950,524

(22) Filed: Nov. 18, 2024

(65) Prior Publication Data

US 2025/0259518 A1 Aug. 14, 2025

(30) Foreign Application Priority Data

Feb. 14, 2024 (JP) ................................. 2024-020177

(51) Int. Cl.

*G08B 7/06* (2006.01)
*B60K 35/26* (2024.01)
*B60K 35/28* (2024.01)

(52) U.S. Cl.

CPC ................ *G08B 7/06* (2013.01); *B60K 35/26* (2024.01); *B60K 35/28* (2024.01); *B60K 2360/16* (2024.01)

(58) Field of Classification Search

CPC ......................................................... G08B 7/06
See application file for complete search history.

(56) References Cited

U.S. PATENT DOCUMENTS 7,432,799 B2 * 10/2008 Tsuboi ................... H04N 7/181 348/E7.086
2005/0275514 A1 * 12/2005 Roberts ................... B60Q 5/00 340/436
2017/0313247 A1 * 11/2017 Hsu ........................ G08G 1/165
2019/0322215 A1 * 10/2019 Tsang .................... E05C 17/006
2021/0293073 A1 9/2021 Morosawa et al.
2021/0355733 A1 * 11/2021 Kong ..................... B60Q 9/008
2022/0118997 A1 * 4/2022 Paus ..................... B60W 50/14

FOREIGN PATENT DOCUMENTS

JP 2021-147854 A 9/2021
JP 2023150030 A * 10/2023

OTHER PUBLICATIONS

"teslamotors/light-show readme", Dec 23, 2021, [retrieved on Jun. 24, 2026]. Retrieved from the Internet <URL: https://github.com/teslamotors/light-show/tree/28cbdc8751445a20a1f2db4efa1ade9c543d146a>.
"teslamotors/light-show/commits", [retrieved on Jun. 24, 2026]. Retrieved from the Internet <URL: https://github.com/teslamotors/light-show/commits/master/?after=9f949512146d881b6eb66d042b22ee3f9e115afb+34>.

* cited by examiner

*Primary Examiner* — Davetta W Goins
*Assistant Examiner* — Pameshanand Mahase
(74) *Attorney, Agent, or Firm* — SoraIP, Inc.

(57) ABSTRACT

A cockpit is capable of executing a light show by outputting music from a speaker and operating a movable component. In addition, the cockpit can detect an obstacle existing around the vehicle. When an obstacle is detected within the detection range corresponding to the movable range of the movable component, the cockpit causes music to be output from the speaker without operating the movable component when the light show is executed.

7 Claims, 3 Drawing Sheets

CONTROL DEVICE FOR VEHICLE

CROSS-REFERENCE TO RELATED APPLICATION

This application claims priority to Japanese Patent Application No. 2024-020177 filed on Feb. 14, 2024, incorporated herein by reference in its entirety.

BACKGROUND

1. Technical Field

The present disclosure relates to a control device for a vehicle.

2. Description of Related Art

A vehicle described in Japanese Unexamined Patent Application Publication No. 2023-150030 (JP 2023-150030 A) includes a back door supported pivotally to be openable or closable relative to the vehicle through rotation, a position specifying unit that specifies a position where an end portion of the back door is located farthest from the vehicle during rotation, and a notification unit that notifies the position specified by the position specifying unit. Accordingly, in the vehicle of JP 2023-150030 A, since the possibility of contact with an obstacle can be understood in advance before a user opens the back door, contact with the obstacle at the time of a back door opening operation can be avoided.

SUMMARY

Incidentally, within a control device of the vehicle, a light show function for a user or a viewer to enjoy may be included by controlling an operation of a component such as a door, in accordance with music flowing from a speaker. In such a case, since the user does not manually operate the component such as a door, it may be difficult to avoid contact with the obstacle at the time of the door opening operation, even if the location specified by the position specification unit is notified.

A control device for a vehicle that solves the problem is applied to a vehicle that includes a speaker and a movable component, in which the control device is able to execute:

- a specifying process that causes the movable component to operate along with outputting music from the speaker, and
- an obstacle detecting process that detects an obstacle present in a periphery of the vehicle, and
- when an obstacle is detected within a detection range corresponding to a movable range of the movable component in the obstacle detecting process, the specifying process causes music to be output from the speaker without operating the movable component.

According to the configuration, the movable component can be suppressed from contacting the obstacle when executing the specifying process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Configuration of the Control Device

Hereinafter, a first embodiment of the present disclosure will be described with reference to FIG. 1 to FIG. 3.

First, a configuration of a control device according to the present embodiment will be described with reference to FIG. 1. As illustrated in FIG. 1, the vehicles 100 are equipped with in-vehicle devices such as a driving assistance DC 200, a cockpit DC 300, and a body DC 400. Note that "DC" is an abbreviation for Domain Controller. These in-vehicle devices are communicably connected to each other. The driving assistance DC 200, the cockpit DC 300, and the body DC 400 constitute the control device 500 of the vehicle.

The driving assistance DC 200 is an electronic control unit that provides a driving assistance function such as an automated braking device or a sudden start preventing device. A cockpit DC 300 is an electronic control unit that provides multimedia-related functions such as navigational and audio. The body DC 400 is an electronic control unit that controls various electrical components such as lights, doors, and mirrors.

Configuration of the Driving Assistance DC

The driving assistance DC 200 is electrically connected to the camera sensor device 10 and the sonar sensor device 20.

Figure 2:
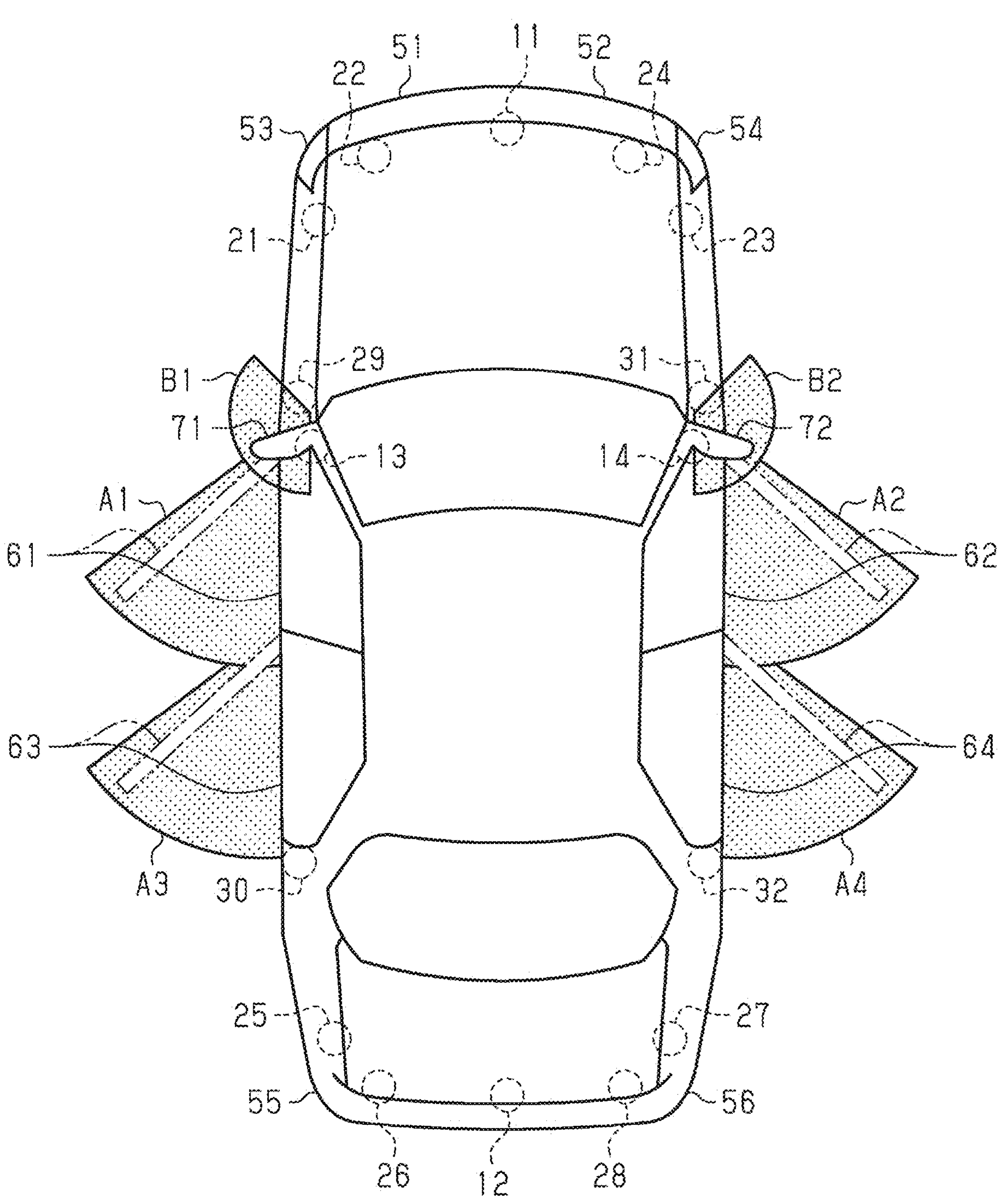
FIG. 2 is a diagram illustrating a detection range of an obstacle according to a movable range of each movable component.

As illustrated in FIG. 2, the camera sensor device 10 includes cameras including a front camera 11, a rear camera 12, a left camera 13, and a right camera 14. In the following description, the front camera 11, the rear camera 12, the left camera 13, and the right camera 14 may be collectively referred to as a "camera 15".

The front camera 11 is attached to the center of the front end portion of the vehicle 100 so as to capture an image of a scene in front of the vehicle 100. The rear camera 12 is attached to the center of the rear end portion of the vehicle 100 so as to capture an image of a landscape behind the vehicle 100. The left camera 13 is attached to a left end portion of the vehicle 100 so as to capture an image of a landscape on the left side of the vehicle 100. The right camera 14 is attached to the right end portion of the vehicle 100 so as to capture an image of the scenery on the right side of the vehicle 100.

Figure 1:
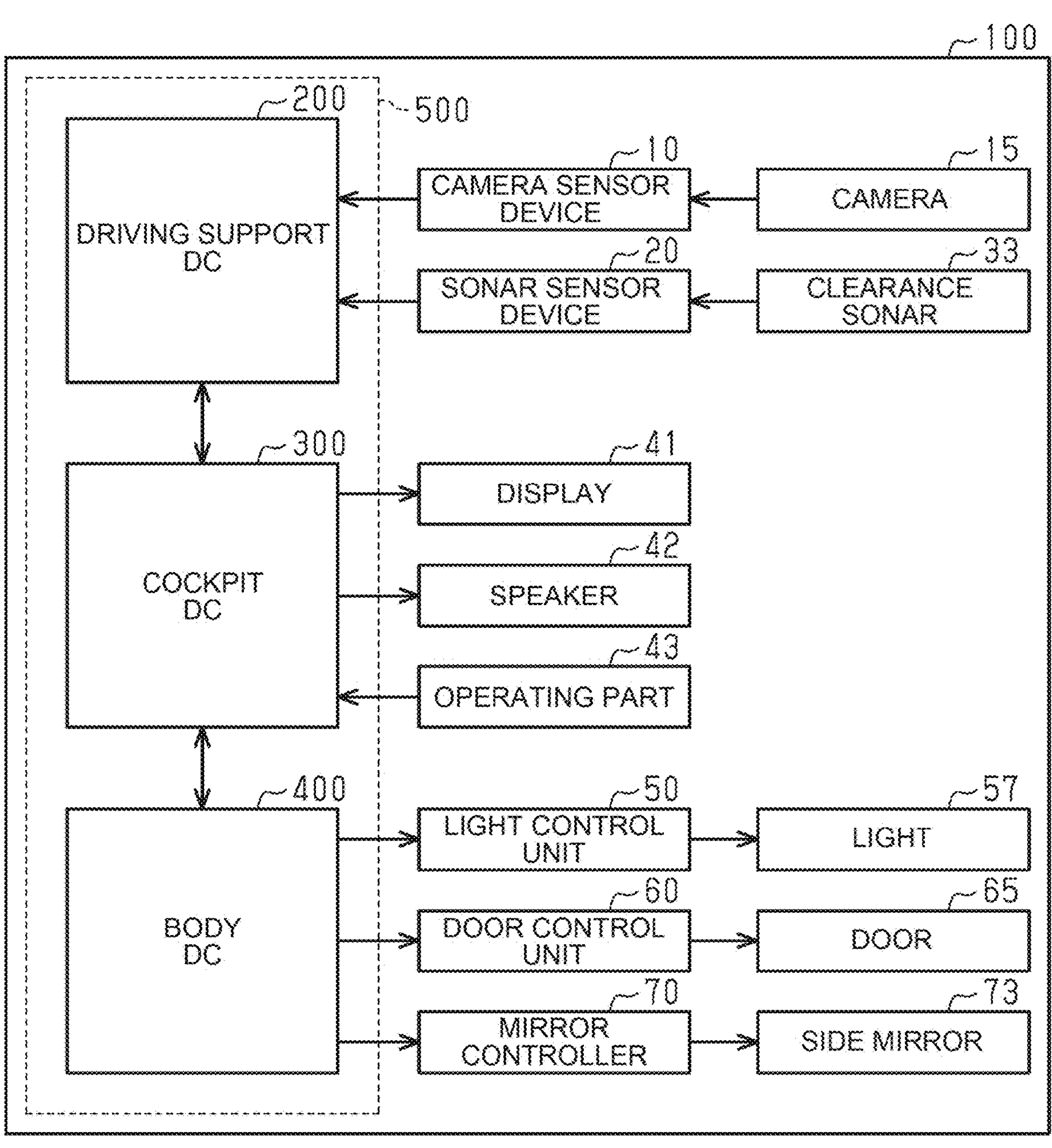
FIG. 1 is a diagram schematically illustrating a configuration of a control device of a vehicle.

As illustrated in FIG. 1, the camera sensor device 10 is electrically connected to a driving assistance DC 200. The driving assistance DC 200 can acquire information about images of the surroundings of the vehicles 100 captured by the camera 15 via the camera sensor device 10.

As shown in FIG. 2, the sonar sensor device 20 includes a first clearance sonar 21 to a twelfth clearance sonar 32. In the following description, the first clearance sonar 21 to the twelfth clearance sonar 32 are collectively referred to as "clearance sonar 33". The clearance sonar 33 emits ultrasonic waves in a predetermined direction and receives the ultrasonic waves reflected by the object.

The first clearance sonar 21 is attached to the vehicle 100 so as to emit ultrasonic waves from the front left end portion to the front left of the vehicle 100. The second clearance sonar 22 is attached to the vehicle 100 so as to emit ultrasonic waves forward from the left front end of the vehicle 100. Similarly, the third clearance sonar 23 is attached to the vehicle 100 from the front right end portion to the front right of the vehicle 100, and the fourth clearance sonar 24 is attached to the vehicle 100 from the front right end to the front right so as to emit ultrasonic waves, respectively. The fifth clearance sonar 25 is attached to the vehicle 100 so as to emit ultrasonic waves from the rear left end portion to the left rear side of the vehicle 100, and the sixth clearance sonar 26 is attached to the vehicle 100 from the left rear end to the rear side thereof. The seventh clearance sonar 27 is attached to the vehicle 100 so as to emit ultrasonic waves from the right rear end portion of the vehicle 100 to the right rear, and the eighth clearance sonar 28 is attached to the vehicle 100 from the right rear end to the rear. The ninth clearance sonar 29 is attached to the vehicle 100 to the left from the front left end of the vehicle 100, and the tenth clearance sonar 30 is attached to the vehicle 100 to the left from the rear left end thereof so as to emit ultrasonic waves. The eleventh clearance sonar 31 is attached to the vehicle 100 from the front right end portion to the right side of the vehicle 100, and the twelfth clearance sonar 32 is attached to the vehicle 100 from the rear right end portion to the right side so as to emit ultrasonic waves, respectively.

As shown in FIG. 1, the sonar sensor device 20 is electrically connected to the driving assistance DC 200. The sonar sensor device 20 transmits the ultrasonic waves emitted by the clearance sonar 33, the ultrasonic waves received by the clearance sonar 33, and the like to the driving assistance DC 200. The driving assistance DC 200 can acquire information about an object existing around the vehicles 100 based on the information received from the sonar sensor device 20.

Configuration of Cockpit DC

The cockpit DC 300 is electrically connected to the display 41, the speaker 42, and the operation unit 43 of the vehicle 100.

The display 41 includes a display unit (not shown) capable of displaying various types of information. The display 41 displays various types of information on the display unit based on an instruction from the cockpit DC 300.

The speaker 42 is configured to output sound. In the present specification, the term "sound" is intended to include any sound or music in addition to a single sound. The speaker 42 outputs a sound based on an instruction from the cockpit DC 300.

The operation unit 43 is configured to be capable of various operations. The operation unit 43 may be a touch panel type operation unit integrated with the display 41 or an operation unit independent of the display 41. The cockpit DC 300 is configured to be capable of inputting an operation signal indicating that the operation unit 43 is operated. The cockpit DC 300 can perform various types of control based on an operation signal inputted from the operation unit 43.

Configuration of the Body DC

The body DC 400 includes a light control unit 50, a door control unit 60, and a mirror control unit 70.

As illustrated in FIG. 2, the light control unit 50 is electrically connected to various lights including a left headlight 51, a right headlight 52, a left winker 53, a right winker 54, a left tail light 55, and a right tail light 56 of the vehicle 100. In the following description, various lights including the respective lights 51 to 56 are collectively referred to as "lights 57". The light 57 is configured to be blinkable. The light control unit 50 blinks the light 57 based on an instruction from the body DC 400.

The left headlight 51 is attached to the left front end of the vehicle 100. The right headlight 52 is attached to the right front end of the vehicle 100. The left winker 53 is attached to a front left end portion of the vehicle 100. The right winker 54 is attached to a rear left end portion of the vehicle 100. The left tail light 55 is attached to the left rear end of the vehicle 100. The right tail light 56 is attached to the right rear end of the vehicle 100.

The door control unit 60 is electrically connected to various types of doors including the first door 61 to the fourth door 64 of the vehicle 100. In the following description, various doors including the first door 61 to the fourth door 64 are collectively referred to as "doors 65". The door 65 is configured to be openable and closable by manual operation, and is configured to be openable and closable by control of the door control unit 60. The door control unit 60 opens and closes the door 65 based on an instruction from the body DC 400. The door 65 is an example of a movable component of the vehicle 100.

The first door 61 is rotatably supported on the left front side of the vehicle 100 so as to be openable and closable with respect to the vehicle 100. The second door 62 is pivotally supported on the right front side of the vehicle 100 so as to be openable and closable by rotation with respect to the vehicle 100. The third door 63 is rotatably supported on the left rear side of the vehicle 100 so as to be openable and closable with respect to the vehicle 100. The fourth door 64 is pivotally supported on the right side rear side of the vehicle 100 so as to be openable and closable by rotation with respect to the vehicle 100.

The mirror control unit 70 is electrically connected to the left side mirror 71 and the right side mirror 72 of the vehicle 100. In the following description, the left side mirror 71 and the right side mirror 72 are collectively referred to as a "side mirror 73". The side mirror 73 is configured to be rotatable under the control of the mirror control unit 70. The mirror control unit 70 rotates the side mirror 73 based on an instruction from the body DC 400. The side mirror 73 is an example of a movable component of the vehicle 100.

The left side mirror 71 is pivotally supported on the left front side of the vehicle 100 so as to be rotatable relative to the first door 61. The right side mirror 72 is pivotally supported on the right side front side of the vehicle 100 so as to be rotatable with respect to the second door 62.

Processing when Running Light Show

The control device 500 can perform a light show execution process for causing the vehicle 100 to execute a light show. The light show is performed in such a manner that music is output from the speaker 42 in accordance with a predetermined program pattern and various electric components of the vehicle 100 operate.

The write show execution process can be executed triggered by an operation of the operation unit 43. The cockpit DC 300 performs a write show execution process on the basis of an operation signal inputted from the operation unit 43, and performs control so as to execute the write show. In the present embodiment, the write show execution process corresponds to a specifying process.

In the light show executing process, the cockpit DC 300 controls the speaker 42 so that a predetermined musical tone is outputted. Further, in the light show execution process, the cockpit DC 300 outputs, to the body DC 400, information instructing the operation of various electrical components of the vehicle 100 at predetermined timings during the light show execution. The information instructing the operation of the various electrical components of the vehicle 100 is, for example, information instructing the blinking of the light 57, information instructing the operation of the door 65, information instructing the operation of the side mirror 73, and the like. The body DC 400 operates various electrical components of the vehicles 100 based on data inputted from the cockpit DC 300. That is, in the light show execution process, the control device 500 operates various movable components including the door 65 and the side mirror 73, and controls blinking of the light 57 of the vehicle 100. Further, the cockpit DC 300 controls the display 41 to execute an execution notification notifying that the light show is being executed as the light show starts.

After that, the cockpit DC 300 terminates the write show by terminating the write show executing process in response to the completion of the predetermined program pattern. At this time, the cockpit DC 300 controls the speaker 42 to stop outputting a predetermined musical tone. The cockpit DC 300 also controls the display 41 to terminate the running notification.

Processing of Stopping the Operation of Movable Components when Executing a Light Show When executing the light show, the control device 500 performs a light show execution operation stop process for stopping the operation of the movable components included in the various electrical components of the vehicle 100. The write show execution-time operation stop process is executed over a period during which the write show is being executed.

Figure 3:
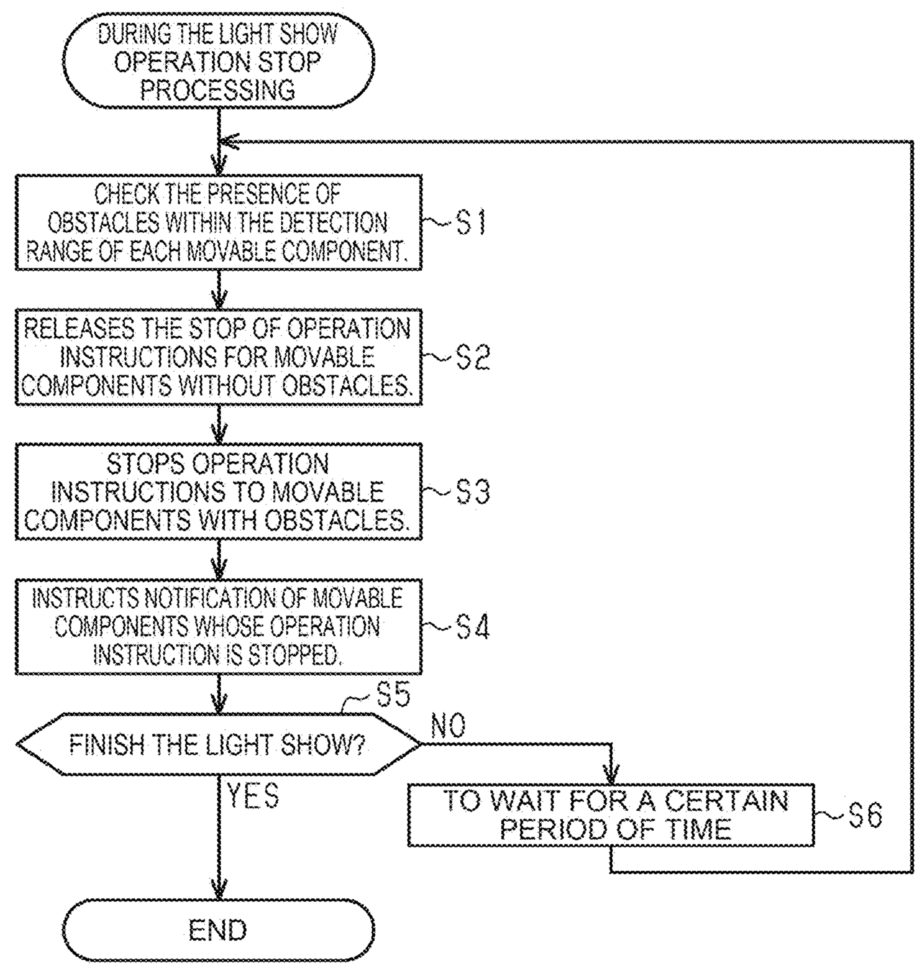
FIG. 3 is a flow chart illustrating a write show execution-time operation stopping process according to a first embodiment.

As illustrated in FIG. 3, in the write show execution-time operation stopping process, the control device 500 checks whether there is an obstacle within the detection range corresponding to the movable components (S1). The process of S1 in the write show execution-time operation stopping process corresponds to an obstacle detecting process of detecting an obstacle existing around the vehicles 100. Specifically, the driving assistance DC 200 outputs, to the cockpit DC 300, information on images of the surroundings of the vehicles 100 captured by the camera 15 acquired via the camera sensor device 10. Further, the driving assistance DC 200 outputs, to the cockpit DC 300, information related to an object existing around the vehicles 100 acquired based on the information received from the sonar sensor device 20. Then, the cockpit DC 300 detects obstacles around the vehicles 100 based on the information inputted from the driving assistance DC 200 to determine whether there is an obstacle within the detection range corresponding to the respective movable components.

As illustrated in FIG. 2, the cockpit DC 300 individually determines whether there is an obstacle within a predetermined detection range for each movable component. For example, the cockpit DC 300 determines whether there is an obstacle within the detection range A1 corresponding to the first door 61. Similarly, the cockpit DC 300 individually determines whether there is an obstacle within the detection ranges of the detection range A2 corresponding to the second door 62, the detection range A3 corresponding to the third door 63, and the detection range A4 corresponding to the fourth door 64. The respective detection ranges A1 to A4 are set in accordance with the movable ranges of the respective doors 61 to 64. More specifically, the detection range A1 is set to include the entire movable range of the first door 61. Similarly, the detection range A2 is set to include the entire movable range of the second door 62, the detection range A3 is set to include the entire movable range of the third door 63, and the detection range A4 is set to include the entire movable range of the fourth door 64.

The cockpit DC 300 individually determines whether there is an obstacle within the detection ranges of the detection range B1 corresponding to the left side mirror 71 and the detection range B2 corresponding to the right side mirror 72. The respective detection ranges B1, B2 are set in accordance with the movable ranges of the respective side mirrors 71 and 72. More specifically, the detection range B1 is set to include the entire movable range of the left side mirror 71. In particular, since the left side mirror 71 is rotatable with respect to the first door 61, the detection range B1 is configured to include the entire largest movable range of the left side mirror 71 considering the movable range of the first door 61. Similarly, the detection range B2 is set to include the entire movable range of the right side mirror 72. In particular, since the right side mirror 72 is rotatable with respect to the second door 62, the detection range B2 is configured to include the entire largest movable range of the right side mirror 72 considering the movable range of the second door 62.

Next, as shown in FIG. 3, the cockpit DC 300 cancels the stopping of the operation instruction for the movable component that has determined that there is no obstacle within the corresponding detection range (S2). In other words, when determining that there is no obstacle within the detection range corresponding to the predetermined movable component, the cockpit DC 300 is capable of outputting, to the body DC 400, the information instructing the operation of the movable component determined to be free of obstacles in the light show execution process.

Subsequently, the cockpit DC 300 performs S3 so as to stop the operation instruction for the movable component that has determined that there is an obstacle within the corresponding detection range. That is, when the cockpit DC 300 determines that there is an obstacle within the detection range corresponding to the predetermined movable component, it does not cause the body DC 400 to output information instructing the operation of the movable component determined to have an obstacle in the light show execution process.

Then, the cockpit DC 300 causes the display 41 to execute an operation stop notification, which is a notification regarding the movable component for which the operation instruction is stopped (S4). Specifically, the cockpit DC 300 causes the display 41 to indicate that the movement of the movable component is stopped due to the presence of an obstacle within the detection range corresponding to the predetermined movable component. At this time, when there is no movable component that has stopped the operation instruction, the operation stop notification is not executed.

Thereafter, the cockpit DC 300 determines whether or not the light show has ended (S5). If the light show has not ended (S5: NO), the cockpit DC 300 waits for a certain period of time (S6), and then repeats the processes after S1. On the other hand, when the write show is ended (S5: YES), the cockpit DC 300 ends the write show execution-time operation stopping process. Incidentally, the cockpit DC 300 releases the stop of the operation instruction to the movable component that is stopping the operation instruction in accordance with the end of the operation stop process at the time of executing the write show, and controls so as to terminate the operation stop notification.

Operation of the First Embodiment

In the above-described light show execution processing, in addition to being able to output music from the speaker 42 and operate various movable components of the vehicle 100, the light 57 of the vehicle 100 can be made to blink.

In the light show execution operation stop process, when an obstacle is detected within a detection range corresponding to each movable component, an operation instruction for the movable component in which the obstacle is detected is stopped. At this time, in the light show execution process, music is output from the speaker 42 without operating the movable component in which the obstacle is detected.

In particular, it is assumed that an obstacle is detected within a detection range corresponding to a part of the movable components among the movable components in the light show execution operation stop process, and an obstacle is not detected within a detection range corresponding to another movable component different from the part of the movable components. In this case, in the light show execution operation stop process, the operation instruction for a part of the movable components in which the obstacle is detected is stopped, while the operation instruction for another movable component in which the obstacle is not detected is not stopped. At this time, in the light show execution process, music is output from the speaker 42 without operating a part of the movable components in which the obstacle is detected, and another movable component in which the obstacle is not detected is operated. In this example, a part of the movable components in which the obstacle is detected corresponds to the first movable component, and another movable component in which the obstacle is not detected corresponds to the second movable component.

Effect of the First Embodiment

The effects of the present embodiment will be described.

(1-1) When an obstacle is detected within a detection range corresponding to a predetermined movable component when a light show is executed, an operation instruction to the movable component is stopped, so that it is possible to prevent the movable component from coming into contact with the obstacle.

(1-2) In the light show execution operation stop process, even when an obstacle is detected within a detection range corresponding to a part of the movable components among the movable components, an operation instruction to the movable components in which the obstacle is not detected within the corresponding detection range is not stopped. According to this configuration, even when an obstacle is detected within a detection range corresponding to a part of the movable components among the movable components, the user or the viewer can be enjoyed by a combination of an operation of another movable component different from the part of the movable components and an output of music.

(1-3) In the light show, in addition to the output of music and the operation of movable components, the flickering of the light can be combined to enjoy the user and the viewer.

(1-4) In the display 41, since the operation stop notification regarding the movable component that has stopped the operation instruction is executed, it is possible to suppress the user or the viewer from feeling uncomfortable because the movable component does not operate in the light show.

(1-5) In the write show execution operation stop process, it is repeatedly determined whether or not there is an obstacle within a detection range corresponding to each movable component at regular time intervals during a period in which the write show is being executed. Then, the operation instruction is stopped for the movable component determined to have an obstacle within the corresponding detection range, and the stop of the operation instruction is released for the movable component determined to have no obstacle within the corresponding detection range. Therefore, even when an obstacle is newly detected within the detection range of the movable component during the execution of the light show, it is possible to prevent the movable component from coming into contact with the obstacle. In addition, when an obstacle within the detection range of the movable component is removed during the execution of the light show, the user and the viewer can be enjoyed by combining the operations of the movable component thereafter.

Second Embodiment

Operation Stop Processing at the Time of Executing the Write Show in the Second Embodiment Next, a second embodiment of the present disclosure will be described with reference to FIG. 4. The control device 500 performs an operation stop process at the time of executing the write show at the time of starting the write show.

Figure 4:
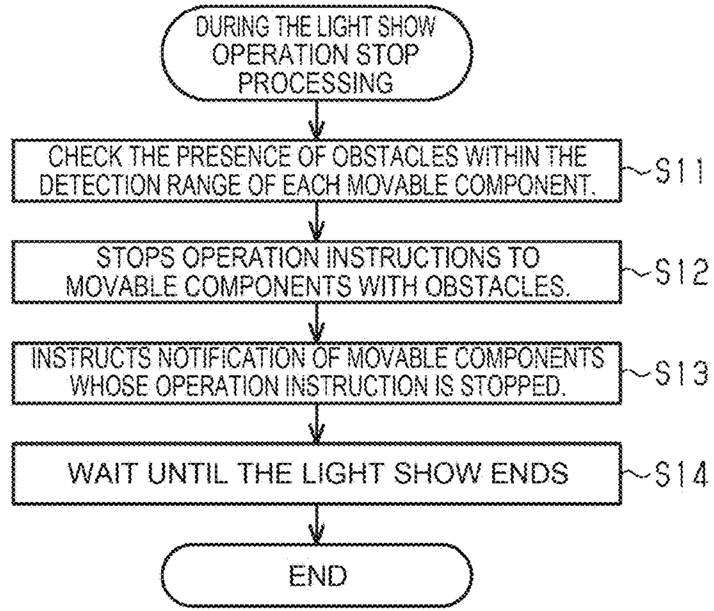
FIG. 4 is a flowchart illustrating a write show execution-time operation stop process according to a second embodiment.

As illustrated in FIG. 4, in the write show execution-time operation stopping process, the control device 500 confirms whether there is an obstacle within the detection range corresponding to the movable components as in the first embodiment (S11). Next, the cockpit DC 300 performs S12 so as to stop the operation instruction for the movable component that has determined that there is an obstacle within the corresponding detection range. Subsequently, the cockpit DC 300 controls S13 display 41 to execute the operation stop notification.

Then, the cockpit DC 300 waits until the light show ends (S14). Thereafter, the cockpit DC 300 ends the write show execution-time operation stopping process. Incidentally, the cockpit DC 300 releases the stop of the operation instruction to the movable component that is stopping the operation instruction in accordance with the end of the operation stop process at the time of executing the write show, and controls so as to terminate the operation stop notification.

Operation and Effect of the Second Embodiment (2-1) In the write show execution operation stop process of the second embodiment, it is determined whether or not there is an obstacle within the detection range corresponding to each movable component at the start of the light show, and then the process waits until the light show ends. According to this configuration, it is possible to easily perform processing for stopping an operation instruction to each movable component as compared with a case where the determination of whether or not there is an obstacle within the detection range corresponding to each movable component is repeated every predetermined time or every time each movable component is operated.

Modifications

The present embodiment can be realized with the following modifications. The present embodiment and the following modifications can be combined with each other within a technically consistent range to be realized.

When the operation stop notification is executed on the display 41, the execution stop notification may be interrupted or terminated. When the operation stop notification is executed on the display 41, the operation stop notification and the execution notification may be executed in parallel.

The in-execution notification and the operation stop notification may be executed on different displays. The display 41 for executing the operation stop notification is not limited to the one provided in the vehicle 100, and may be, for example, a display of a mobile terminal held by a user. In this case, the cockpit DC 300 may be configured to provide the display of the mobile terminal of the user with information about the movable component whose operation instruction is stopped via the radio network.

The operation stop notification and the execution notification are not limited to those displayed on the display 41, and may be executed by, for example, audio output by the speaker 42 or blinking of the light 57. The operation unit 43 is not limited to the one provided in the vehicle 100, and may be, for example, an operation unit of a portable terminal held by a user. In this case, the cockpit DC 300 may be configured to execute the light show in response to the acquisition of the information indicating that the operation unit of the mobile terminal of the user is operated via the radio network.

The number and position of the camera 15 and the clearance sonar 33 may be changed as appropriate. The camera sensor device 10 and the sonar sensor device 20 are not limited to being connected to the driving assistance DC 200, and may be connected to a cockpit DC 300 or a body DC 400, or may be combined with them. In this case, the cockpit DC 300 may detect an obstacle around the vehicle 100 based on information inputted from the camera sensor device and the sonar sensor device connected to the cockpit DC 300 or the body DC 400.

The cockpit DC 300 may detect an obstacle around the vehicle 100 based on one of information about images around the vehicle 100 and information about an object existing around the vehicle 100.

A method of detecting an obstacle around the vehicle 100 may be changed as appropriate. For example, instead of the cockpit DC 300, the driving assistance DC 200 or the body DC 400 may detect an obstacle around the vehicles 100. The driving assistance DC 200 and the body DC 400 output the detected obstacle to the cockpit DC 300. The cockpit DC 300 may be configured to stop and release the operation instruction to the movable components based on the driving assistance DC 200 or the detection result inputted from the body DC 400.

When the cockpit DC 300 determines that there is an obstacle within the detection range corresponding to the predetermined movable component, it may be configured to output, to the body DC 400, ignore instruction information instructing to ignore the operation instruction to the predetermined movable component. In this case, the body DC 400 may stop the operation of the predetermined movable component by ignoring the operation instruction information when the operation instruction information for instructing the operation of the predetermined movable component is input after the input of the ignoring instruction information for the predetermined movable component.

When the cockpit DC 300 determines that there is an obstacle within the detection range corresponding to the predetermined movable component, the cockpit may stop the operation instruction to both the predetermined movable component and the other movable component. For example, when the cockpit DC 300 determines that there is an obstacle within the detection range corresponding to at least a part of the movable components that can operate in the light show, the cockpit DC 300 may suspend the operation instruction to all the movable components. In addition, when the cockpit DC 300 determines that there is an obstacle within a detection range corresponding to a specific movable component among the movable components that can operate in the light show, the cockpit DC 300 may suspend an operation instruction to both the specific movable component and another movable component corresponding to the specific movable component. At this time, the cockpit DC 300 may not stop an operation instruction to another movable component that does not correspond to a particular movable component.

The detection range corresponding to each movable component may be changed as appropriate. For example, the detection range corresponding to each movable component may be the same as the movable range of each movable component.

The same detection range may be set for a plurality of movable components. In this case, the detection range may be set to include all of the movable ranges of the plurality of movable components. In addition, the cockpit DC 300 may stop the operation instruction for all of the plurality of movable components when it is determined that there is an obstacle within the detection range.

The frequency of determining whether or not there is an obstacle in the write show execution operation stop process may be changed as appropriate. For example, the cockpit DC 300 may determine whether or not there is an obstacle in the detection range corresponding to the movable component prior to the operation of the movable component every time the movable component is operated in the light show.

There may be a plurality of types of music output from the speaker 42 in the light show. In this case, the music output by the operation of the operation unit 43 may be selected. There may be a plurality of types of program patterns for the light show. The program pattern of the light show may be configured to be settable by the user.

The timing at which the light show ends may be changed as appropriate. For example, the cockpit DC 300 may terminate the light show when a predetermined period of time has elapsed since the light show started. The cockpit DC 300 may terminate the light show based on an instruction from the operation unit 43.

Various electrical components operated in the light show may be changed as appropriate. For example, a back door, a power window, a bonnet, a sunroof, an oil supply port, a charging port, and the like of the vehicle 100 may be operated. In addition, any or all of the door, the mirror, and the light may not be operated. That is, in the light show, at least one movable component may operate in accordance with the output of music from the speaker 42.

What is claimed is:

1. A control device applied to a vehicle that includes a speaker and a movable component, the control device comprising one or more electronic control units configured to:

receive an operation signal from an operation device electrically connected to the one or more electronic control units;

select music from a plurality of kinds of music based on the operation signal;

execute a light show execution process by outputting the selected music from the speaker and causing the movable component to operate in accordance with a predetermined program pattern, the movable component being an electrical component of the vehicle that includes a light, a door, and a mirror;

execute an obstacle detecting process that detects an obstacle present in a periphery of the vehicle, the obstacle detecting process being executed over a period during which the light show execution process is being executed; and stop operation of the movable component while maintaining output of the selected music in response to detection of an obstacle within a detection range corresponding to a movable range of the movable component during the obstacle detecting process.

2. The control device according to claim 1, wherein, in the light show execution process, blinking of the light is controlled.

3. The control device according to claim 1, wherein the one or more electronic control units are further configured to cause a display mounted on the vehicle to display a notification that an operation of the movable component is stopped due to the obstacle being present within the detection range.

4. The control device according to claim 1, wherein the vehicle further includes a first movable component and a second movable component as the movable component, and the one or more electronic control units are further configured to cause the first movable component and the second movable component to operate during the light show execution process in a case where, by the obstacle detecting process, no obstacle is detected within a first detection range corresponding to a movable range of the first movable component and a second detection range corresponding to a movable range of the second movable component, and stop operation of the first movable component while maintaining operation of the second movable component in response to detection of an obstacle within the first detection range during the obstacle detecting process in a state where no obstacle is detected within the second detection range.

5. The control device according to claim 1, wherein the one or more electronic control units are further configured to start and end execution of the light show execution process in response to the operation signal.

6. The control device according to claim 1, wherein the one or more electronic control units are further configured to select the predetermined program pattern from among a plurality of program patterns.

7. The control device according to claim 1, wherein the electrical component further includes at least one of a back door, a power window, a bonnet, a sunroof, an oil supply port, and a charging port.

* * * * *